United States Patent [19]

Bowden et al.

[11] 4,229,863
[45] Oct. 28, 1980

[54] SADDLE CLAMP ASSEMBLY

[75] Inventors: Lloyd L. Bowden; C. Burton Dickinson, both of Clawson, Mich.

[73] Assignee: Dickinson & Bowden Associates, Inc., Farmington, Mich.

[21] Appl. No.: 945,604

[22] Filed: Sep. 25, 1978

[51] Int. Cl.² ........................................... B65D 63/00
[52] U.S. Cl. ..................................................... 24/277
[58] Field of Search ......................... 24/277, 276, 275; 248/58; 285/366, 420

[56] References Cited

U.S. PATENT DOCUMENTS

| | | | |
|---|---|---|---|
| 2,719,345 | 10/1953 | Riker | 24/277 |
| 2,959,834 | 11/1960 | Graham | 24/277 |
| 2,993,255 | 7/1961 | Jagiel | 24/277 |
| 3,984,134 | 10/1976 | Engman | 24/277 |
| 4,040,152 | 8/1977 | Gilgallon | 24/277 |
| 4,056,869 | 11/1977 | Eisma | 24/277 |
| 4,079,487 | 3/1978 | Coop | 24/277 |
| 4,122,586 | 10/1978 | Nothdurft | 24/277 |

Primary Examiner—Ramon S. Britts
Attorney, Agent, or Firm—Cullen, Sloman, Cantor, Grauer, Scott & Rutherford

[57] ABSTRACT

A saddle clamp comprises a hollow unit saddle body of general U-shape with bottom wall and upturned side walls having opposed substantially semi-circular inner edge portions. End portions of the bottom wall terminate in upturned continuous formed sockets. Edge portions of said side walls and corresponding portions inwardly of said edge portions above said sockets are oppositely inturned defining tubular extensions of said sockets. A U-bolt projects through the tubular extensions, sockets and bottom wall having adjustable fasteners thereon. The inner arcuate edge portions of the saddle define with the U-bolt an internal annular gripping surface extending throughout 360 degrees. The saddle clamp assembly is adapted for application to a pair of assembled inner and outer pipe sections with said annular inner gripping surface forming on and completely around the outer pipe section an annular deformation therein with a corresponding annular deformation within and around the inner pipe section, providing an airtight seal therebetween. The saddle body is formed from a unit blank with the side walls as extensions of the bottom wall and with the sockets and tubular extensions formed as an integral extension of the bottom wall and adjacent portions of the side walls.

2 Claims, 5 Drawing Figures

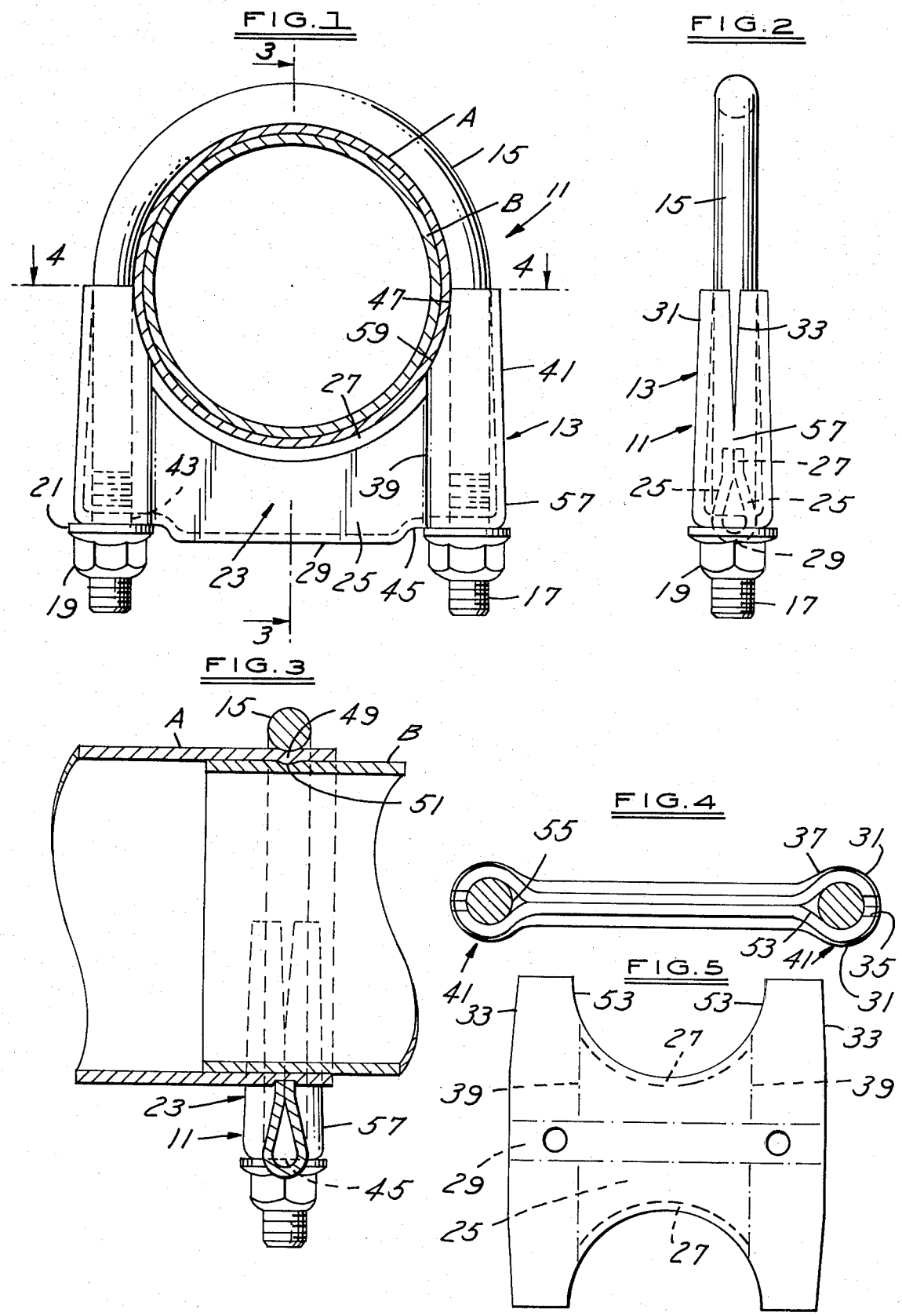

SADDLE CLAMP ASSEMBLY

BACKGROUND OF THE INVENTION

Heretofore, in the construction of saddle clamps, particularly those used for securing together a pair of telescoped engaging pipe sections such as may be involved between a muffler and an exhaust pipe, various types of clamping mechanisms have been provided securing the pipe sections together and capable of suspending the assembly from a vehicle frame. The difficulty with clamping mechanisms heretofore known of this type was the lack of effectiveness in rigidly securing the pipe sections together against relative movement rotatively or longitudinally and of effecting a proper airtight seal between the sections to prevent the escape of exhaust gases at such connection. Examples of earlier efforts in obtaining a suitable saddle-type clamp are found in the following United States Patents:

| Osborn | 3,137,053 | June 16, 1964 |
| Osborn | 3,192,593 | July 6, 1965 |
| Zimmerman | 3,284,866 | November 15, 1966 |
| Webber | 3,604,676 | September 14, 1971 |
| Spotts | 3,605,214 | September 20, 1971 |
| Dowling | 3,772,745 | November 20, 1973 |
| Dowling | 3,879,815 | April 29, 1975 |
| Heckathorn | 3,955,250 | May 11, 1976. |

SUMMARY OF THE INVENTION

It is an object of the present invention to provide an improved saddle clamp assembly particularly useful for gripping one or a pair of assembled pipe sections and more particularly, for gripping and suspending a pair of assembled pipe sections such as may be found between a vehicle muffler outlet pipe and the connecting tailpipe assembled thereto.

It is a further object to provide an improved saddle clamp which is formed from a single unit blank so as to define a hollow U-shaped saddle body having integral bottom and side walls and with upright unit end sockets formed therein by the flowing of the metal of the blank and with the sockets terminating in socket extensions and wherein, no fastening means or welding is required.

It is another object to provide an improved saddle clamp assembly which has increased structural strength in view of the unit box formation of the saddle body including the bottom wall side wall and end sockets all flowed and formed from the unit metal blank which has been precut and wherein, the adjacent inturned edge portions of the side walls and corresponding spaced inner portions of the side walls have been further formed so as to define a pair of socket extensions at the ends of the saddle body adapted to receive a U-bolt.

These and other objects will be seen from the following specification and Claims in conjunction with the appended drawing.

THE DRAWING

FIG. 1 is a side elevational view of the present saddle clamp as assembled over a pair of overlapped pipe sections shown in cross section.

FIG. 2 is an end elevational view thereof.

FIG. 3 is a fragmentary section taken in the direction of arrows 3—3 of FIG. 1.

FIG. 4 is a plan section taken in the direction of arrows 4—4 of FIG. 1.

FIG. 5 is a plan view on a reduced scale of the unit metal blank for the saddle clamp body.

It will be understood that the above drawing illustrates merely a preferred embodiment of the invention, and that other embodiments are contemplated within the scope of the Claims hereafter set forth.

DETAILED DESCRIPTION OF THE INVENTION

Referring to the drawing, the present saddle clamp assembly is generally indicated at 11, FIGS. 1 and 3, mounted over a pair of engaging assembled pipe sections; namely, the outer pipe section A and the inner pipe section B, fragmentarily shown in FIG. 3. Though, not limited thereto, the present saddle clamp assembly is particularly adapted for securing and sealing together of a pair of pipe sections such as the outlet from a vehicle muffler and the telescoped end portion of the adjacent tailpipe for securing the pipe elements together against relative longitudinal or rotary movement for suspending them from a vehicle frame and for sealing the joint between the pipe sections.

The present saddle clamp assembly includes the saddle 13, U-bolt 15 with threaded ends 17 and fasteners 19 adjustably applied to said U-bolt and adapted for operative engagemen with said saddle. Lock washers 21 are interposed between the fasteners and the bottom of the saddle and in the illustrative embodiment, form an integral part of the fasteners.

Viewing FIGS. 1 and 3, in normal use with the pipe sections A and B secured together and suspended from a vehicle body, Figures in actual use would be inverted 180 degrees from the positions shown in FIGS. 1 and 3, with the U-bolt ends facing upwardly to facilitate attachment to some portion of the vehicle body.

Saddle 13 is formed from a unit blank such as shown in FIG. 5 and has a body of a hollow box-type which is generally of U-shape in cross section and includes opposed upwardly and inwardly inclined side walls 25.

These walls terminate in the arcuate edge portions 27 which extend throughout an arc of substantially 180 degrees and are, therefore, semicircular. Said body includes the bottom wall 29 of which the side walls extend from and are an integral part thereof.

The respective side walls 25 terminate in the upright opposing inturned arcuate edges 31, FIGS. 2 and 4, whose opposing edges taper upwardly and outwardly as at 33.

Formed into said blank integral with bottom wall 29 are a pair of unit tubular sockets 57, FIG. 3, formed by flowing the metal of the blank. These sockets include the continuous arcuate outer edge portions 35 which extend around the upright end portions of the saddle body merging with the adjacent portions of the side walls 25.

During the forming operation, formed along the upright creased lines 39 are the corresponding inturned portions 37 which are spaced inwardly of the outer edge portions 31 to define the tubular extensions or guides 41 for the U-bolt 15.

End portions 45 of bottom wall 29 are laterally offset towards the tubular extensions 41, but parallel to bottom wall 29 and are transversely apertured at 43 to receive the threaded ends of said U-bolt which project therethrough as in FIGS. 1 and 3.

The opposed and parallel engaging semi-circular inner edge portions 27 of the side walls 25 merge with the upper inner arcuate ends of the tubular extensions 41 along the arcuate portions 59. These at the upper ends of the extensions 41 are tangent with respect to portions of the U-bolt as at 47 to thus define with the internal curvature of the U-bolt an internal annular gripping surface which extends throughout 360 degrees and particularly, with respect to the pipe sections A and B.

Accordingly, upon tightening of the fasteners 19 to a predetermined torque such as 19 foot pounds, for example, there is formed within the outer pipe section A an annular deformation seal or rib 49 which extends throughout 360 degrees and which engages within a formed corresponding annular seal 51 or deformation formed within the inner pipe section B to thus provide a substantially airtight seal between the pipe sections A and B and at the same time, securing the pipe sections together against relative longitudinal movement or relative rotary movement.

The opposed internal and inwardly directed edge portions 37 defining the socket extensions 41 are tapered upwardly and outwardly as at 53, FIG. 4, to define notches 55 so that the arcuate surfaces 59, FIG. 1 extend tangentially to and merge with the adjacent inner wall portions of the U-bolt 15.

Accordingly, inner arcuate edge portions 27 and the corresponding edge portions 59 formed within the guides 41 define with the interior surfaces of the U-bolt 15 an internal annular gripping surface which extends throughout 360 degrees. Accordingly, when the saddle clamp assembly is assembled over the telescoping and connected pipe sections A and B, as in FIGS. 1 and 3, and a predetermined torque is applied to the fasteners 19, such as 19 or 20 foot pounds, approximately, the compressive forces will form within the adjacent pipe section A the annular 360 degree indentation 49 and the corresponding interlocked indentation 51 within the pipe element B such as to provide an airtight seal between the two pipe sections, as assembled.

Since the sockets 57 adjacent the bottom wall 29, are achieved in the method of manufacture, their method of forming would include the use of the unit steel blank in FIG. 5. The blank when first folded along the transverse lines which define the base 29, generally provide saddle body 23 which is hollow and generally U-shaped in cross section, with the side walls 25 extending upwardly and inclined inwardly, as shown in FIG. 2. The inward formation of the side walls also includes the formation of the semi-circular arcuate edge portions 27 which are parallel and engaging, to thus provide a double wall thickness of the metal forming a part of the internal annular gripping surface to engage the assembled pipe sections A and B.

In the step of further upsetting the base wall 29 to form the longitudinally offset base wall offsets 45, suitable downward pressure applied to the adjacent side wall portions 25 of the blank and portions of the bottom wall flow the metal so as to provide the unit sockets 57 as an integral part of the clamp body.

The final forming of the blank includes the forming of the tubular extensions 41 with the opposite inturning of edge portions 31 of the side walls of the blank and, at the same time, inwardly forming portions of the side walls inwardly of the edge portions as along the crease lines 39 to form the substantially circular sockets 57 and the socket extensions 41 upon opposite ends of the saddle body.

Accordingly, with the final formation of the saddle body, there is no additional outside securing of the parts together other than in the initial forming operation of the blank shown in FIG. 5 to the final shape shown in FIGS. 1 through 4.

The present saddle clamp is particularly used to clamp two pieces of pipe together. For example, one pipe element A is swaged out to a 2.510 inches inside diameter and the other pipe element B is 2.500 outside diameter. The two pipes are telescoped together for a distance of approximately three inches.

The primary object of the present saddle clamp assembly is to hold the two pipe elements together under a vehicle such as joining the muffler to the exhaust pipe, and provide a rigid connection which has a minimum gas leakage and does not come loose in service.

Should the joint come loose in service, it would allow an unsightly appearance of parts hanging under the vehicle, permit rattles, caused by a loose exhaust system and would allow noises generated by exhaust gas leaks.

The present construction provides a high-unit loading area since the opposed arcuate inner edge portions 27 define between the U-bolt and the tubular extensions 41 an internal annular gripping surface which extends throughout 360 degrees. This provides a high-unit loading area to cause the sealing of the pipe joint without the high torque requirement on the two fasteners 19. The sealing is effected by the production of the continuous annular indentations 49 and 51 within the pipe elements A and B.

The high unit loading is generated by folding the two sides of the saddle body in against each other, forming a clamping surface at 27 which is a two-metal thickness, i.e., approximately 0.160 inches around the inside pipe contact radius of the saddle to the point where the radius is tangent to the surface of the U-bolt.

In the illustrative embodiment, the U-bolt has a three-sixteenths radius which also gives a high-unit loading area against the assembled pipes.

From tests, this design generates a seal between the two pipe sections with approximately 19 foot pounds of torque per nut applied. This allows less than one cubic foot of air leak per minute. The design resists rotation between the two pieces of pipe. It has been found that with the 19 foot pounds of torque, it requires more than 300 foot pounds of torque to cause relative rotation between the two pipe sections.

The annular 360-degree gripping surface between the saddle body and the U-bolt causes the uniform 360-degree deformations shown at 49 and 51, FIG. 3.

This is believed illustrative of the increased strength built into the double wall formation of the present saddle clamp body, the unit sockets 57 and the corresponding socket extensions 41.

Having described our invention, reference should now be had to the following Claims.

We claim:

1. A saddle clamp assembly comprising a hollow unit saddle body of general U-shape in cross section, said body including a bottom wall apertured adjacent its ends;
   the edges of said bottom wall terminating in upturned side walls;
   said side walls having opposed substantially semi-circular inner edge portions;
   said side walls being inclined inwardly towards upper edges, said semi-circular inner edge portions being parallel;
   end portions of the bottom wall terminating in integral upturned continuous formed sockets;

edge portions of said side walls and corresponding portions inwardly of said edge portions above said sockets being oppositely inturned defining substantially tubular extensions above said sockets;

said saddle body being formed from a unit blank, with said side walls formed as integral extensions of said bottom wall and with said sockets and tubular extensions formed as integral extensions of said bottom wall and portions of said side walls;

said semi-circular inner edge portions being in engagement, forming a double wall thickness gripping area;

said sockets thoughout their exterior surfaces extending to and being integral with said side walls respectively, being continuous in plan and flowed as a unit part of said bottom wall and adjacent portions of said side walls;

said inturned edge portions of said sockets being inclined upwardly and outwardly defining V-shaped notches outwardly of said U-bolt;

the inturned corresponding portions of the side walls inwardly of said edge portions above said sockets being inclined upwardly and outwardly at said semi-circular edge portions defining V-shaped notches, and curved to form an extension of said semi-circular edge portions;

a U-bolt having threaded ends projected through said tubular extensions, sockets and bottom wall;

and adjustable fasteners mounted over said threaded ends operatively engageable with said bottom wall;

the arcuate inner edge portions of said side walls merging with the upper inner ends of said tubular extensions and tangential to the U-bolt; to define between said U-bolt, said saddle inner edge portions and adjacent portions of said tubular extensions an internal annular gripping surface extending throughout 360 degrees.

2. In the saddle clamp assembly of claim 1, the apertured ends of said bottom wall being parallel to and transversely offset from said bottom wall in the direction of said sockets.

* * * * *